United States Patent [19]

Cochrane, Jr. et al.

[11] Patent Number: 4,839,873
[45] Date of Patent: * Jun. 13, 1989

[54] SUBSEA ACOUSTIC RELOCATION SYSTEM

[75] Inventors: Douglas A. Cochrane, Jr.; Fred W. Styer, both of Lafayette, La.

[73] Assignee: Cochrane Subsea Acoustics, Inc., Lafayette, La.

[ * ] Notice: The portion of the term of this patent subsequent to Aug. 3, 2002 has been disclaimed.

[21] Appl. No.: 763,394

[22] Filed: Aug. 7, 1985

Related U.S. Application Data

[63] Continuation of Ser. No. 395,918, Jul. 7, 1982.

[51] Int. Cl.[4] ............................................. H04B 1/59
[52] U.S. Cl. ...................................... 367/133; 367/4; 441/2; 114/293; 114/230
[58] Field of Search ...................... 441/2, 7, 16, 23-27, 441/33; 367/2, 4, 131, 133; 114/230, 293

[56] References Cited

U.S. PATENT DOCUMENTS

| | | | |
|---|---|---|---|
| 3,287,753 | 11/1966 | Race | 367/133 X |
| 3,628,205 | 12/1971 | Starkey et al. | 367/4 X |
| 4,067,282 | 1/1978 | Guinn et al. | 114/230 |
| 4,136,415 | 1/1979 | Blockburger | 367/133 X |
| 4,262,379 | 4/1981 | Jankiewicz | 441/23 |
| 4,358,834 | 11/1982 | Swenson | 367/4 |
| 4,535,430 | 8/1985 | Cochrane, Jr. et al. | 367/133 |

Primary Examiner—Thomas H. Tarcza
Assistant Examiner—Daniel T. Pihulic
Attorney, Agent, or Firm—Pravel, Gambrell, Hewitt, Kimball & Krieger

[57] ABSTRACT

A subsea acoustic relocation system provides an apparatus that includes in one embodiment an anchor, and in another embodiment a weighted frame having in part a casing which has an inner bore with an open top portion. A line canister connected to the anchor or disposed within the casing bore has an opening through which a contained canister line can pay out. The canister line is placed within the line canister and is anchored at one end to the anchor or frame, the other end of the canister line being a free end which dispenses from the canister during operation. An acoustic transponder release assembly is detachably affixed to the anchor or frame (within the casing bore) at a provided removable connection which can be broken by an acoustic signal. The acoustic transponder release assembly has attached to it the free end of the line canister with the acoustic transponder release forming a temporary connection of the free end of the line to the frame. A buoyant float is provided for carrying the free end of the canister line to the water surface responsive to a breaking of the removable connection. A float has a buoyant force value sufficient to lift the free end of the line but an insufficient buoyant force value to overcome the anchor or to lift the weighted frame. The buoyant force value of the float is also preferably sufficient to lift the acoustic transponder release assembly to the water surface area.

10 Claims, 3 Drawing Sheets

SUBSEA ACOUSTIC RELOCATION SYSTEM

This is a continuation of application Ser. No. 395,918 filed July 7, 1982 entitled "Subsea Acoustic Relocation System."

BACKGROUND OF THE INVENTION

1. Field of the Invention

The present invention relates to undersea relocation systems and more particularly relates to a system for relocating an underwater object by means of a retrievable marker buoy which is released to the surface responsive to a received acoustic signal, carrying with it the free end of a contained canister line and preferably an acoustic signal receptive release transponder.

2. General Background

It is frequently desirable to relocate an object underwater such as, for example, an abandoned oil well, a subsea wellhead or "Christmas tree" as well as pipeline valves, pipeline crossings, completions and the like. In addition, it is desirable to be able to repeatedly relocate anchor pennant lines for retrieval as these lines are used with floating rigs, dredges, etc.

Often times objects to be relocated are in water which is of low visibility and which can be very deep. In addition, the relocation may need to be performed during a time in which the water surface is rough complicating relocation efforts. Many systems have been patented attempting to solve the problem of undersea relocation. Some such devices have used an explosive charge to disengage a buoyed system from its anchor. Other devices have used an explosive charge to inflate a bag-type buoyancy module to provide the needed uplifting force to cause a system to ascend. Such explosive devices are both unreliable and can cause environmental damage in the form of, for example, fish kills. Other devices have used a search or tag line that is wound around that portion of the buoyant component which ascends to the surface. This method of paying out the search line can be unreliable as the line must unwind from the buoyancy component which is in motion and the line can often fowl and/or get tangled as it is paid out from the erractically wiggling buoy.

As an example of such previously patented devices, note for example, U.S. Pat. No. 3,722,014 issued to Hill, et al, entitled "Retrievable Buoy." That patent provides a retrievable submersible buoy which is anchored at an underwater location and includes an explosive charge release mechanism which releases the buoy from its anchor in response to a remotely actuated signal.

U.S. Pat. No. 3,889,307 issued to George Houot is entitled "Remote-Controlled Underwater Buoy." The '307 patent provides a remote-controlled, immersed buoy which allegedly makes it possible to connect an object placed on the ocean floor to the surface by means of a wire rope and includes a body member kept in the immersed position by a latching assembly which is capable of being freed by a beacon upon reception of an acoustic signal. A wire rope attached to an anchoring element winds on a drum as the buoy is raised. A removable electric motor is used to wind the wire rope on its drum to bring the buoy to the immersed position.

U.S. Pat. No. 3,487,486 is of a type which is normally immersed and which can be raised to the surface in response to a remote control signal. This type of buoy comprises a body element connected by a cable to an anchoring element lying on the sea bottom and a thrust device bringing the body member to the surface under the action of a release mechanism remotely controlled from the surface. When the buoy floats, a wire rope is used for linking the anchoring element with the surface.

In oceanography, it is known to set up a current recorder on or near the ocean bottom for the monitoring of various paramters such as water temperatures, salinity, p.h., flow rates, and to collect this recorded data at the end of a desired time interval. In order to do this, it is necessary to retrieve the recorder after the desired time period and to disassemble the recorder in order to get the information contained within. One device which has been used in the past for the undersea placement of such recorders is a digital acoustic command system which is marketed under the trademark "SEA LINK." Such a system is based on an acoustic code from a ship board or surface vessel that is transmitted through the water to an underwater unit. If the code or codes are accepted by unit a command function is actuated. This command function may be a mechanical release of the underwater unit, a command to shut down or turn on the underwater unit or an external control signal to actuate a valve, for example. Such systems as the "SEA LINK" consist of a shipboard unit with a transducer and one or more underwater units. The standard underwater units incorporate a transponder with a release mechanism and can have additional commands available. Underwater units can contain various command decoders for external command functions. Such underwater units known as release/transponders can be used at depths of up to, for example, twenty thousand (20,000) feet.

U.S. Pat. No. 3,775,736 entitled "Acoustical Underwater Control Apparatus" provides an apparatus for controlling the operation of underwater equipment from the surface by wireless signals and monitoring the status of underwater equipment. A power source is provided for continuously supplying power to the underwater system. A minimal number of hardline connections are provided between the surface and underwater units.

An "Oceanographic Apparatus" is the subject of U.S. Pat. No. 3,287,753. That patent relates to oceanographic devices and more particularly to an underwater buoy having a floatable portion which may released in response to sonic signals from a remote transmitter.

A "System for Activating a Remote Underwater Device" is the subject of U.S. Pat. No. 3,742,440. A frequency coded acoustic wave generator is used having at least one notch frequency in the transmission spectrum. The generator is adapted to transmit simultaneous assertion and negation frequencies. An acoustic responsive receiver is located at the remote underwater device. The receiver includes a code validation logic arrangement responsive to each received acoustic wave verifying the simultaneous presence and absence of the assertion and negation frequencies. A utilization circuit also in the receiver is reponsive only to a verification signal from the validation logic.

An underwater "Hydraulic Latch" is the subject of U.S. Pat. No. 3,553,795 issued to D. E. McDougal.

An "Underwater Transponder Calibration Arrangement" is the subject of U.S. Pat. No. 4,097,837.

These devices as aforementioned frequently use explosive charges to disengage the system. Some are very complex and can be unreliable. Some are not easily operated and are prone to malfunction.

While some attempt to provide a float which carries a line to the surface, many are not self-contained and rugged enough to be left for long periods of time beside a desired object to be located later and then still operate after such that without extraneous complex connections being necessarily made first by a diver.

3. General Discussion of the Present Invention

The present invention provides a subsea acoustic relocation apparatus having a portion for anchoring a line canister at the seabed which canister has an opening through which a contained canister line can pay out. The canister line is placed within the line canister and is anchored at one end to the canister, the other end being a free end which dispenses from the canister during operation. An acoustic transponder release detachably affixes to the frame at a provided removable connection which can be broken by an acoustic signal. The acoustic transponder having attached thereto the free end of the canister line with the temporary connection affixing the free end to the seabed at a provided anchor. A buoyant float is provided for carrying the free end of the canister line to the water surface responsive to a breaking of the removable connection. In one embodiment a weighted frame supports a canister and the transponder/release. In that embodiment, a cradle on the frame supports the buoy on the frame prior to release of the removable connection, thus providing a structrually integral, self-contained apparatus that can be easily transported.

The buoy is of a sufficient buoyancy value to lift the free end of the canister line (and preferably the attached acoustic transponder), but its buoyancy value is insufficient to overcome the provided seabed anchor. A flexible sling can be provided connecting the buoy with the frame allowing the buoy to tether a distance above the canister once the buoy is submerged. The line canister and the acoustic transponder release means can be placed side-by-side within the casing bore with their longitudinal axes generally parallel.

With the frame embodiment, the cradle can comprise a plurality of struts extending upwardly from the frame and supporting at their uppermost ends, the buoy. The buoy can be a spherical buoy with each of the struts supporting the spherical buoy at its lower half so as not to interfere with upward movement of the buoy when desired.

The apparatus can provide a pressure sensitive strob light carried by the buoy for emitting a lighted signal responsive to movement of the buoy to the water surface.

The buoy and the acoustic transponder release assembly can rise together to the water surface when the removable connection is broken. In such an embodiment, the buoy would have sufficient buoyancy to lift both the free end of the canister line and the acoustic transponder release assembly.

In the method of the present invention, the assembly is anchored at or near a desired object to be relocated at a future designated relocation time. Provided is a line canister having a canister line therein with one end of the canister line anchored to the seabed area and the other end being a free end which is attached to a buoyed structure which can lift the canister line free end but not overcome the anchor. The buoyed structure is secured at the seabed with a removable connection that can be broken with an acoustic signal. An acoustic signal is emitted by a surface vessel, for example, at the designated relocation time causing the buoy and the free end of the canister line to rise to the water surface area.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein.

DETAILED DESCRIPTION OF THE PREFERRED EMBODIMENT

Figure 1:
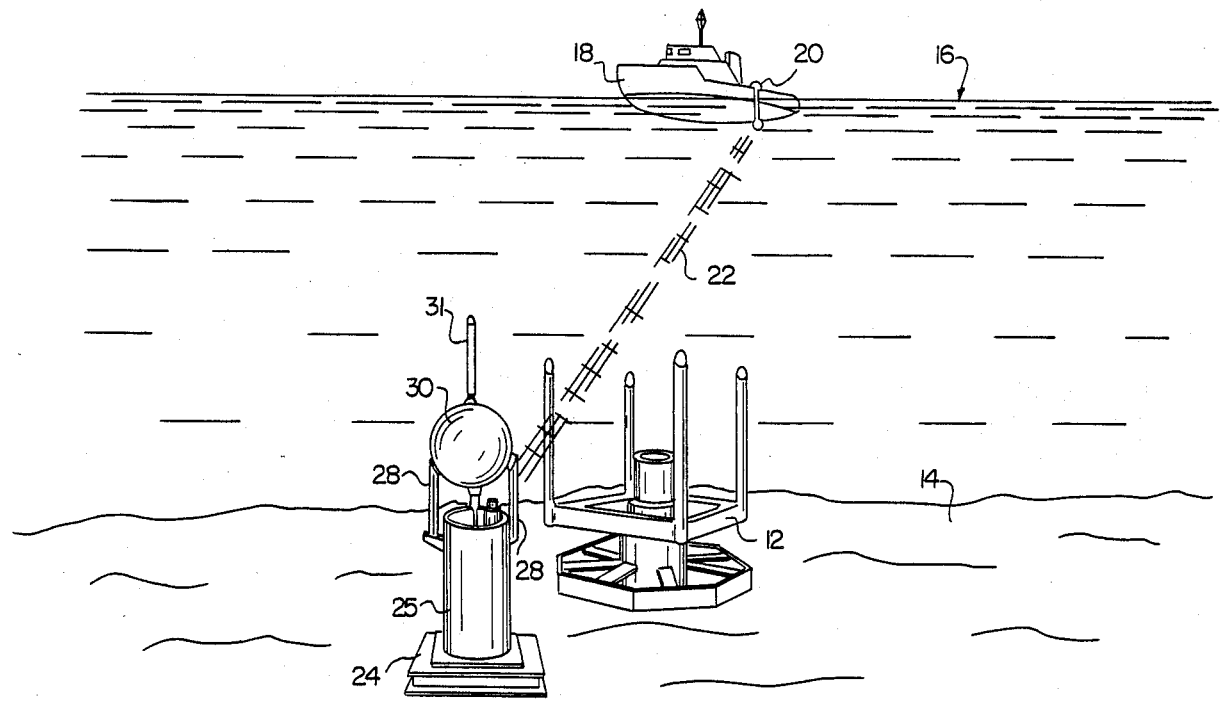
FIG. 1 is a perspective view of the preferred embodiment of the subsea acoustic relocation system of the present invention prior to an acoustic release of the buoy and its attached acoustic transponder release assembly.
Figure 2:
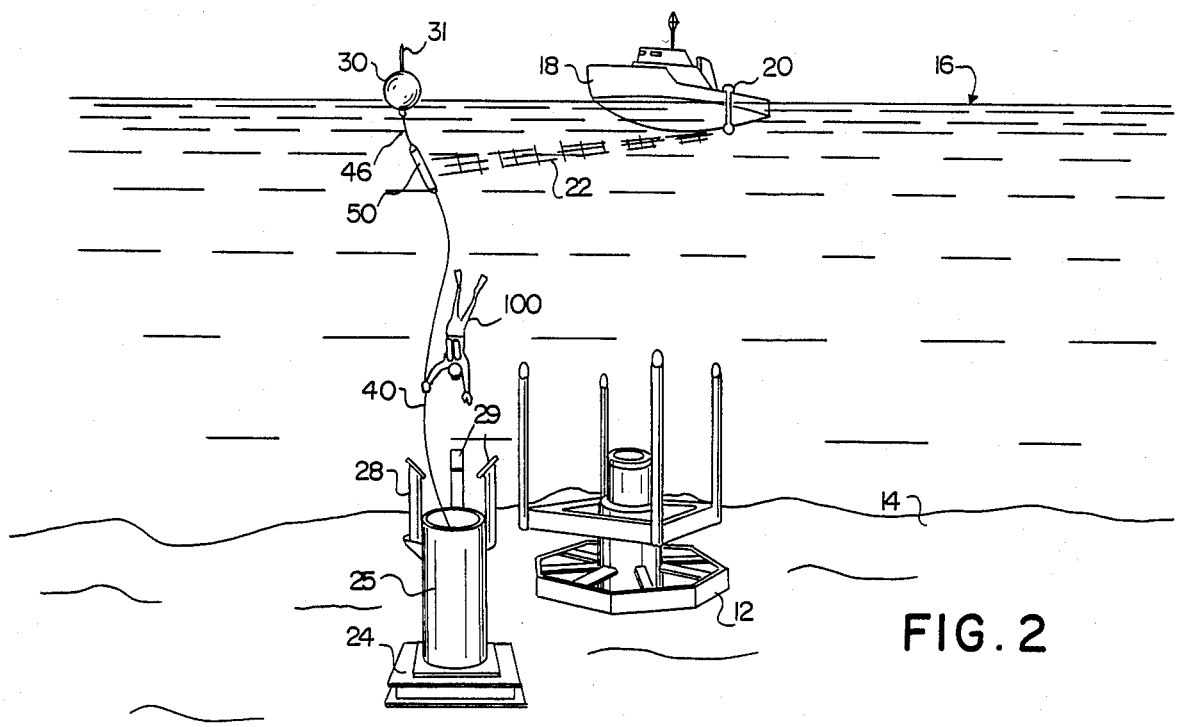
FIG. 2 is a perspective view of the subsea acoustic relocation system of the present invention after buoy release has occurred illustrating relocation by a diver.

FIGS. 1 and 2 show an underwater wellhead 12, for example, or any other object which would be desirably relocated as will be described more fully hereinafter. Under sea wellhead 12 or object lies upon seabed 14 which is a distance below the water surface 16. A surface vessel 18 occupies water surface 16 and is equipped with a transponder 20 for emitting an acoustic signal 22.

On seabed 14 is placed in one embodiment of the present invention, weighted frame 24 having as part thereof casing 25 which is preferably cylindrical and open-ended as will be discussed more fully hereinafter. Casing 25 affixes by welding, for example, to base plate 39 at 38 which is affixed to frame 24.

A plurality of buoy cradle legs 28 comprise a cradle for supporting buoy 30. A plurality of rubber pads 29 from an interface between cradle legs 28 and buoy 30. Buoy 30 can be equipped with a pressure responsive strob light 31 which activates upon surfacing of buoy 30 to water surface "16."

A line 40 is shown in FIG. 2 connecting buoy 30 and canister 26 (FIG. 4) at seabed 14 after release has taken place (as will be described more fully hereinafter) responsive to the emission of acoustic signal 22. Diver 100 can descend line 40 and easily relocate object 12 adjacent the bottom of line 40 as is desirable. Such relocation can take place many years into the future as the apparatus of the present invention is dependable, rugged, and equipped to operate for a long period of time in its underwater environment even after prolonged marine exposure.

Figure 3:
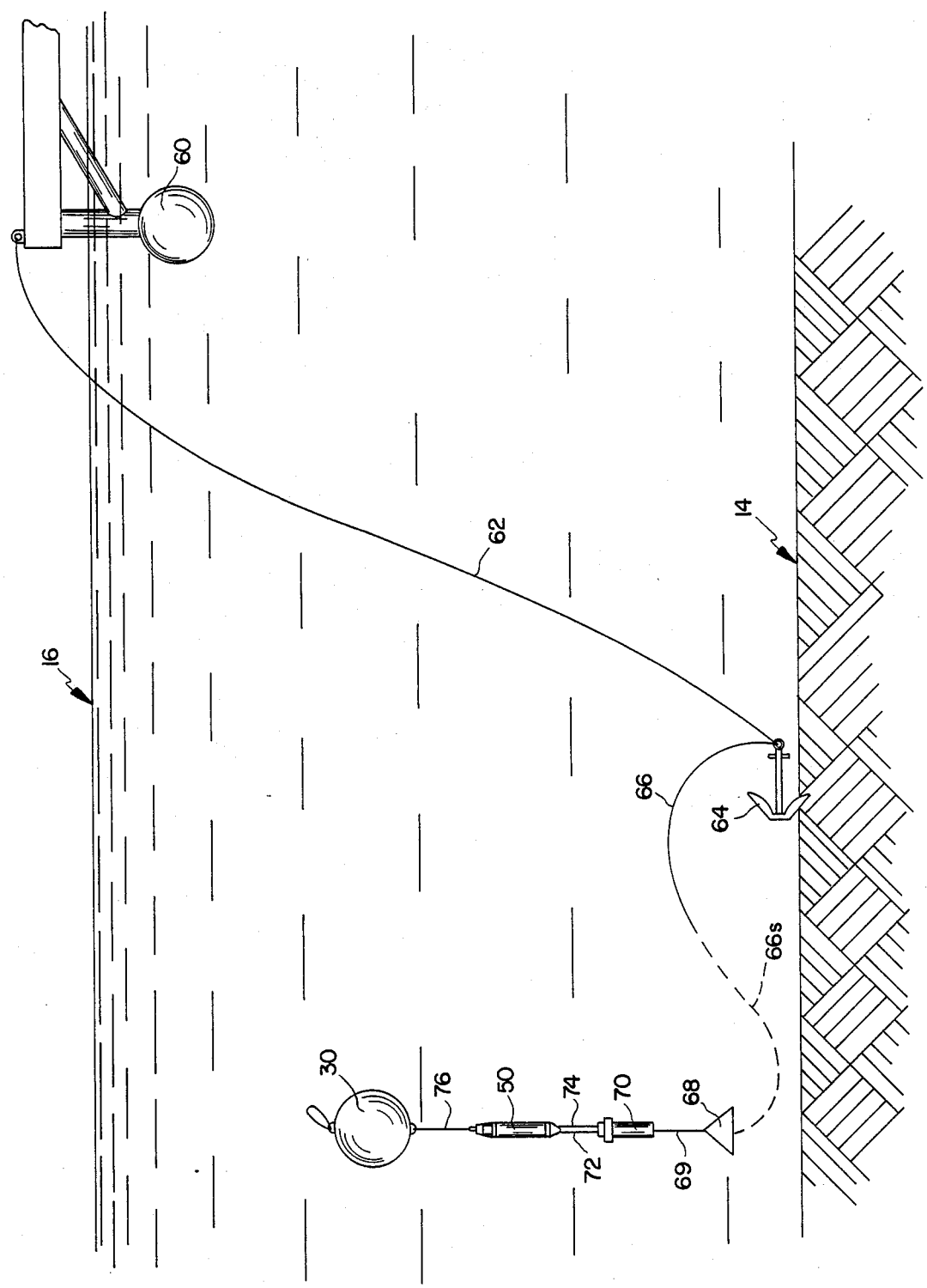
FIG. 3 is a schematic illustration of the preferred embodiment of the apparatus of the present invention as used in anchor pennant line relocation.
Figure 4:
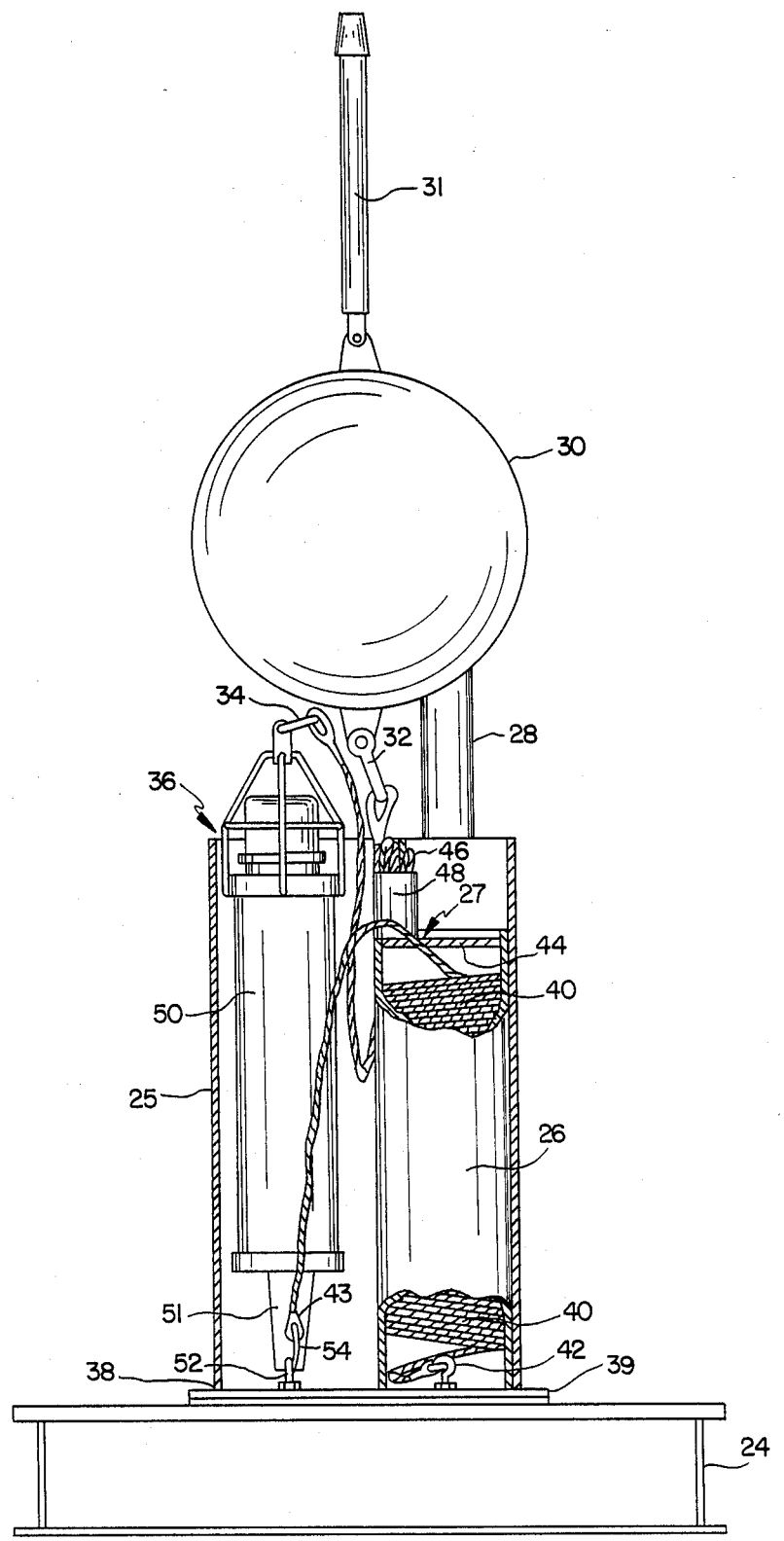
FIG. 4 is a sectional elevational view of one embodiment of the apparatus of the present invention using a weighted, self-contained transportable frame.

FIG. 4 shows more particularly the construction of buoy 30, acoustic release/transponder 50, line canister 26 and the means for retaining the line canister 26 at the seabed 14 adjacent object 12 to be relocated. It should be understood that frame 24 is exemplary of an anchoring means to secure line 40 at or near the seabed. Other means include by way of example, the anchor of FIG. 3, directly tying a sling between the canister and seabed 14 area, or affixation to object 12 to be relocated.

Line canister 26 is preferably cylindrical and open-ended at its upper end portion. A canister plug 44 provides an opening 27 which allows line 40 to pay out from canister 26. The free end 43 of line 40 attaches as shown to acoustic transponder release assembly 50 at a provided anchor 54 on the lowermost portions 51 of the transducer release assembly. The acoustic transponder release 50 affixes at a second anchor 52 by means of a detachable connection. Anchor 52 can be a U-bolt or the like attached by bolting or welding to frame 24. Note the lowermost portion 51 of acoustic transponder release assembly 50 is providing the mechanical, removable detachable connection. Such acoustic transponder release unit 50 can be, for example, a conventional acoustically operated underwater release transponder such as is manufactured under the name "SEA LINK." Suitable units would be, for example, models 722-A and 723-A of Sea Link Systems of Herndon, Virginia. Such an acoustic release/transponder provides both range and distance information to the surface vessel 18. In the preferred embodiment, the acoustic release transponder rises to the water surface 16 with buoy 30 after release. This is desirable as it allows communication between vessel 18 and acoustic release/transponder 50 before, during and after release. Thus, if the seas were very rough, or if a sudden storm deteriorated weather conditions, the buoy 30 and acoustic release transponder 50 assembly could be communicated with continuously.

The uppermost end portion 36 of casing 25 would be open-ended so that line 40 could pay out therefrom and also this allows acoustic transponder release assembly 50 to ascend with buoy 30. Buoy 30 and acoustic transponder release assembly 50 would be connected by means of sling 46 which would attach to buoy 30 at shackle 32 and to acoustic transponder release unit 50 at shackle 34. Provided at the uppermost portion of canister 26 is sleeve 48 for housing sling 46 during shipment and prior to use. Line 40 is anchored to frame 24 at line anchor 42, and is coiled within canister 26 and pays out therefrom. This prevents tangling of line 40 during ascent of buoy 30 and its attached acoustic transponder release assembly 50 as shown in FIG. 2, since the line canister remains static in its position at the seabed.

FIG. 3 shown schematically the use of the present system for anchor pennant line relocation. In that FIG., a floater rig 60 occupys a position at water surface 16 with a rig anchor line 62 descending from floater rig 60 to anchor 64. Anchor pennant line 66 attaches anchor 60 to supplemental anchor pennant line 66S (phantom lines) which in turn attached to sinker weight 68. Line canister 70 is attached to sinker weight 68 by means of sling 69 while the uppermost portion of line canister 70 dispenses from an opening portion thereon the free end 72 of a contained canister line (not shown) which is similar in structure and operation to canister line 40 of FIGS. 1, 2 and 4. Acoustic release/transponder 50 affixes at the uppermost portion or free end 72 of canister line 40, and also removably connects by sling 74 to the removable connection portion of acoustic release transponder 50. Upon receipt of an acoustic signal, buoy 30 and acoustic release/transponder 50 would rise as connected by sling 76 carrying the free end of line 40 therewith. Sling 74 would connect acoustic release transponder 50 to canister 70 so that one the detachable connection which is provided on acoustic release/transponder 50 were released and the assembly of buoy 30 and acoustic release/transponder 50 could rise to the surface carrying free end 72 of the canister line with them. Once line 72 reaches surface "16," the anchor pennant line would be raised using supplemental pennant line 66s. Normally pennant line 66 would be very heavy, such as several pounds per foot, as wire rope if often used. In such as case, supplemental pennant line 66s can be used as an intermediate line. Supplemental line 66s could be, for example, one inch to one and one-half inch diameter rope. This allows a smaller canister line to be used which can be contained within a canister 70 of reasonable size. Line 40 would preferably be, for example, a non-hockling type single braid nylon which could be randomly packed in canister 70, such as is manufactured by Samson Ocean Systems. The term non-hockling is used in the marine industry for line which by composition and braiding resists tangle or snarling.

Line 40 is preferably a non-hockling type line such as, for example, a nylon strand, single braid-type line which can be randomly packed into canister 26 and yet still pay out neatly.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A method of undersea relocation to the water surface of an anchor initially positioned on a seabed, comprising the steps of:
    (a) positioning a line container having an elongated stored container line with a free end that can pay out from the container near the anchor on the seabed to be relocated at a future designated relocation time;
    (b) providing an anchor pendant line initially positioned on the seabed, attached to the anchor to be relocated and of a sufficient length to extend between the seabed area and the water surface;
    (c) providing an intermediate line for forming a connection between the container line and the anchor pendant line and of a length sufficient to extend between the seabed area and the water surface;
    (d) emitting an acoustic signal at the designated relocation time, causing a buoyed structure and one end of the container line to rise to the water surface area as line dispenses from the line container;
    (e) lifting the end of the intermediate line connected to the free end of the container line with the container line until it reaches the water surface; and
    (f) raising an end of the anchor pendant line to the water surface using the intermediate line.

2. The method of claim 1, wherein the intermediate line is attached at its first end portion to the anchor pennant line and at its second end portion to the container line.

3. The method of claim 1, wherein the buoyed structure rises through the use of an acoustic transponder responsive to emission of the acoustic signal.

4. The method of claim 1, wherein the anchor pennant line has a weight per foot greater than the weight per foot of the intermediate line.

5. The method of claim 1, wherein the intermediate line has a weight per foot greater than the weight per foot of the container line.

6. A method of undersea relocation to the water surface of an anchor having an attached anchor pendant line initially positioned upon the seabed, using an elongated stored container line with a free end that can pay out from the container, comprising the following steps:
    (a) positioning a line container adjacent the anchor that is to be relocated at a future designated relocation time;

(b) forming a connection between the free end of the container line and anchor pendant line to be relocated using an intermediate line of a length sufficient to extend between the seabed area and the water surface and having a weight per foot greater than the weight per foot of the container line;

(c) emitting an acoustic signal at the designated relocation time, for releasing a buoyed structure taht carries one end of the container line to the water surface area as line pays out from the container;

(d) lifting an end of the intermediate line using the container line; and (e) raising the anchor pendant line using the intermediate line.

7. The method of claim 6, wherein the anchor pennant line has a weight per foot greater than the weight per foot of the intermediate line.

8. The method of claim 6, wherein the intermediate line is attached at its first end portion to the anchor pennant line and at its second end portion to the container line.

9. The method of claim 6, wherein the buoyed structure rises with an acoustic transponder responsive to emission of the acoustic signal.

10. A method of undersea relocation of a desired object on a seabed to the sea water surface using an elongated stored container line with a free end that can pay out from a container and a heavier intermediate line that is of sufficient length to extend between the seabed area and water surface, comprising the steps of:

(a) positioning the container adjacent the desired object on the seabed that is to be relocated at a future designated relocation time;

(b) forming a connection at the seabed between the free end of the container line and the object to be relocated using the intermediate line, the intermediate line having a weight per foot greater than the weight per foot of the container line;

(c) emitting an acoustic signal at the designated relocation time;

(d) releasing a buoyed structure using a non-explosive mechanical detachable so that the buoyed structure carries the free end of the container line connected to the intermediate line to the water surface area as line pays out from the container;

(e) lifting an end of the intermediate line that is attached to the free end of the container line from the seabed to the water surface so that the intermediate line spans between the object to be relocated and the water surface; and (f) raising the object to be relocated to the water surface using the intermediate line.

* * * * *